G. W. MOORE.
HAIR DRIER.
APPLICATION FILED MAR. 10, 1919.
1,304,589.
Patented May 27, 1919.
2 SHEETS—SHEET 1.
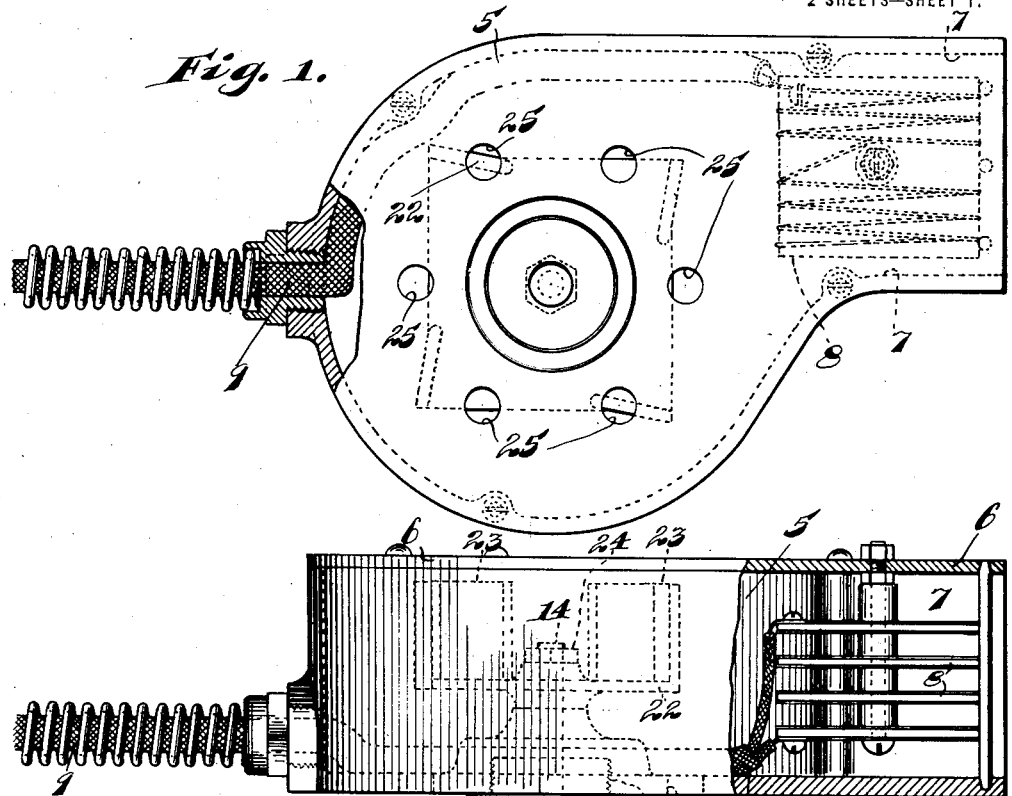
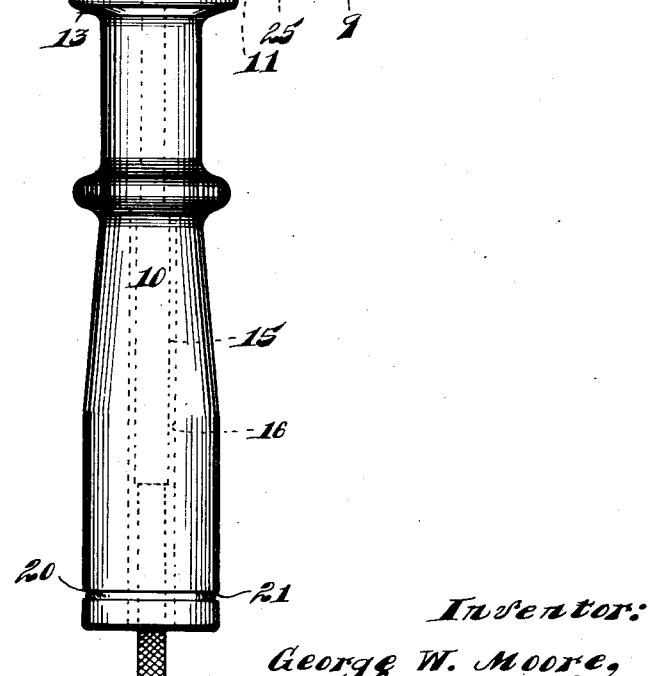
Witnesses:
C. E. Wessels
B. J. Richards
Inventor:
George W. Moore,
By Joshua R. H. Potts
Attorney.

G. W. MOORE.
HAIR DRIER.
APPLICATION FILED MAR. 10, 1919.

1,304,589.

Patented May 27, 1919.
2 SHEETS—SHEET 2.

Witnesses:
C. E. Wessels
B. Y. Richards

Inventor:
George W. Moore,
By Joshua R. H. Potts
Attorney.

UNITED STATES PATENT OFFICE.

GEORGE W. MOORE, OF CHICAGO, ILLINOIS.

HAIR-DRIER.

1,304,589.   Specification of Letters Patent.   Patented May 27, 1919.

Application filed March 10, 1919.   Serial No. 281,743.

*To all whom it may concern:*

Be it known that I, GEORGE W. MOORE, a citizen of the United States, and a resident of the city of Chicago, county of Cook, and State of Illinois, have invented certain new and useful Improvements in Hair-Driers, of which the following is a specification.

My invention relates to improvements in hair driers, and has for its object the provision of an improved device of this character which is of simple construction and efficient in operation.

Other objects will appear hereinafter.

The invention consists in the combinations and arrangements of parts hereinafter described and claimed.

Figure 3:
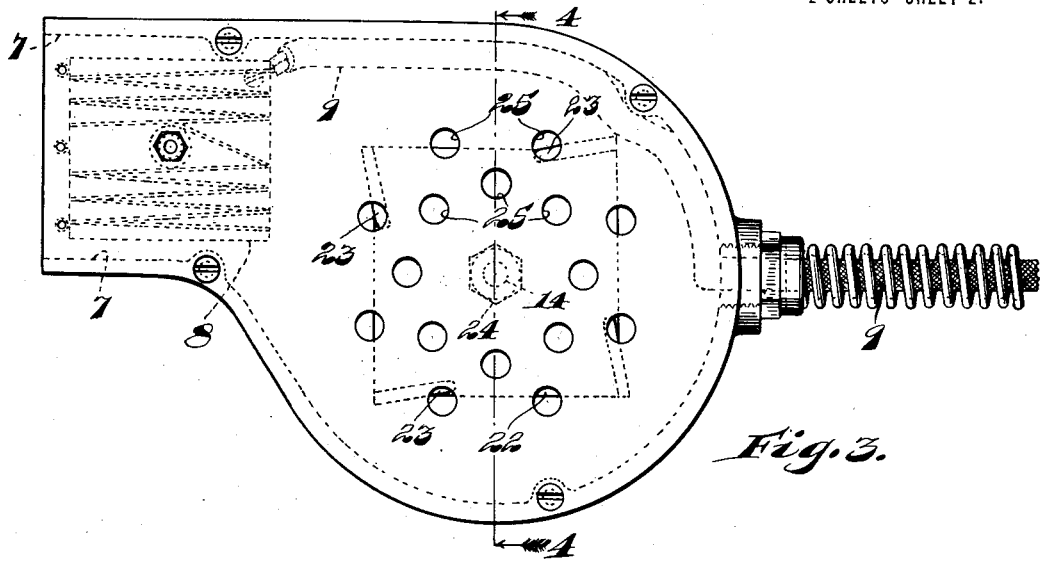
Figure 4:
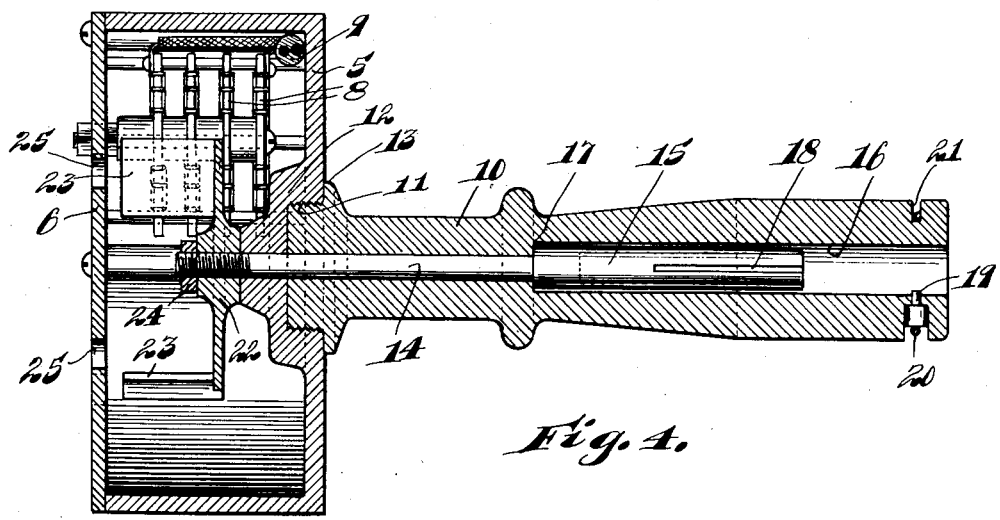

The invention will be best understood by reference to the accompanying drawings forming a part of this specification, and in which, Figure 1 is a side view of a hair drier embodying the invention, shown partially in section, Fig. 2, a top plan view corresponding to Fig. 1, Fig. 3, a view of the side of the hair drier opposite to that shown in Fig. 1, and Fig. 4, a section taken on line 4—4 of Fig. 3.

The preferred form of construction, as illustrated in the drawings, comprises a suitable casing 5 having a removable side 6 giving access to the interior thereof, said casing being substantially circular in form and provided with a tangential air outlet 7. The air outlet 7 is equipped with suitable electrical heating means 8 fed with current through a suitable flexible electric cord 9, as shown.

The casing 5 is equipped with a removable hollow handle 10 secured to the side thereof co-axially therewith, said handle being provided at its inner end with a threaded projection 11 fitting within a threaded socket 12 formed on the side of casing 5, said handle being also provided with a stop shoulder 13 contacting with the outer face of the side of casing 5.

A shaft 14 is mounted in handle 10 and extends co-axially into casing 5, said shaft being provided at its outer end with an enlargement 15 positioned in an enlarged socket 16 in the outer end of said handle. The enlargement 15 on shaft 14 forms a stop shoulder 17 engaging the corresponding stop shoulder at the inner end of socket 16, as shown in Fig. 4, thus preventing inward longitudinal movements of shaft 14, and the enlargement 15 is hollow or in socket form and provided with a slot 18 to receive and connect with an ordinary flexible shaft, such as is commonly in use. A stop pin 19 is arranged at the outer end of socket 16 and is yieldingly pressed inward by an annular steel wire spring 20 seated in a groove 21 for the purpose, said stop pin being arranged to engage said flexible shaft in the usual manner to temporarily hold the same in operative engagement with shafts 14 and 15.

A centrifugal fan is mounted within the casing 5, being provided with a hub 22 threaded on the inner end of shaft 14 and seated against the inner end of socket 12, thus serving to lock the shaft 14 in operative position in the handle and casing. The fan is provided with laterally extending centrifugal blades 23 and is locked in position on the inner end of shaft 14 by means of a lock nut 24. Suitable air inlet openings 25 are provided in the sides of casing 5 to admit the air which is expelled from the casing in the form of a blast through outlet 7 and heating element 8, as will be readily understood.

By this arrangement, a simple and efficient device for the purpose is provided. The arrangement is such that the device may be readily manipulated and utilized for drying hair without interference from the flexible shaft which operates the fan 22—23.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:—

1. A hair drier comprising a casing having an air outlet; a handle for said casing; a shaft extending through said handle; a fan on said shaft arranged to expel a blast of air from said outlet; and means for coupling a flexible shaft to the shaft in said handle, substantially as described.

2. A hair drier comprising a casing having an outlet; electrical heating means in said outlet; a handle for said casing; a shaft extending through said handle; a fan on said shaft arranged to expel a blast of air from said outlet; and means for coupling a flexible shaft to the shaft in said handle, substantially as described.

3. A hair drier comprising a casing having an air outlet; a handle for said casing; a shaft extending through said handle; a fan secured to the end of said shaft in said casing and arranged to expel a blast of air from said outlet, said fan serving also to secure said shaft in place in said handle; and means for coupling a flexible shaft to the shaft in said handle, substantially as described.

4. A hair drier comprising a casing having an air outlet; electrical heating means for said outlet; a handle for said casing; a shaft extending through said handle; a fan secured to the end of said shaft in said casing and arranged to expel a blast of air from said outlet, said fan serving also to secure said shaft in place in said handle; and means for coupling a flexible shaft to the shaft in said handle, substantially as described.

5. A hair drier comprising a substantially circular casing having a tangential air outlet; a handle detachably secured to said casing substantially co-axially therewith, said handle being provided with a threaded projection at its inner end threaded in a suitable socket in said casing; a shaft extending through said handle, the outer end of said handle being provided with an enlarged socket forming a shoulder and the outer end of said shaft being enlarged to form a shoulder fitting against the shoulder in said handle; a centrifugal fan threaded on the inner end of said shaft and bearing against said casing to hold said shaft in place in said handle, there being air inlet openings in the sides of said casing; and means on the enlarged outer end of said shaft for coupling a flexible shaft thereto, substantially as described.

6. A hair drier comprising a substantially circular casing having a tangential air outlet; electrical heating means in said outlet; a handle detachably secured to said casing substantially co-axially therewith, said handle being provided with a threaded projection at its inner end threaded in a suitable socket in said casing; a shaft extending through said handle, the outer end of said handle being provided with an enlarged socket forming a shoulder and the outer end of said shaft being enlarged to form a shoulder fitting against the shoulder in said handle; a centrifugal fan threaded on the inner end of said shaft and bearing against said casing to hold said shaft in place in said handle, there being air inlet openings in the sides of said casing; and means on the enlarged outer end of said shaft for coupling a flexible shaft thereto, substantially as described.

In testimony whereof I have signed my name to this specification in the presence of two subscribing witnesses.

GEORGE W. MOORE.

Witnesses:
JOSHUA R. H. POTTS,
HELEN F. LILLIS.